United States Patent [19]

Lindacher

[11] Patent Number: 5,173,603
[45] Date of Patent: Dec. 22, 1992

[54] FOCUS CHANGING APPARATUS AND METHOD FOR OPTICAL SCANNERS

[75] Inventor: Joseph M. Lindacher, Cambridge, Ohio

[73] Assignee: NCR Corporation, Dayton, Ohio

[21] Appl. No.: 765,620

[22] Filed: Sep. 25, 1991

[51] Int. Cl.$^5$ .............................................. H01J 3/14
[52] U.S. Cl. ..................................... 250/236; 359/216
[58] Field of Search ............................... 250/234–236, 250/566, 568; 358/206–208; 359/216–219; 372/24

[56] References Cited

U.S. PATENT DOCUMENTS

| | | | |
|---|---|---|---|
| 3,924,937 | 12/1975 | Munroe et al. | 359/216 |
| 4,370,654 | 1/1983 | Krutsch | 359/216 |
| 4,413,878 | 11/1983 | Lettington | 359/216 |
| 4,461,534 | 7/1984 | Runciman | 359/203 |
| 4,624,528 | 11/1986 | Brueggemann | 359/216 |
| 4,733,072 | 3/1988 | Lettington | 359/216 |
| 4,938,551 | 7/1990 | Matsumoto | 359/216 |

Primary Examiner—David C. Nelms
Assistant Examiner—S. Allen
Attorney, Agent, or Firm—Paul W. Martin

[57] ABSTRACT

A focus changing apparatus and method for an optical scanner which can easily be adapted to existing optical scanners or can provide the front end for a new scanner. The laser beam focus changing apparatus may be optically located between a laser source and a mirrored spinner and includes a plurality of spherical mirror segments having a predetermined radius. Each is located at its respective radius from a common axis. A rotating device, such as a motor, rotates the spherical mirror segments about their common axis. The spherical mirror segments may be mounted on top of the mirrored spinner. If so, the focus changing apparatus may additionally include a deflector mirror for deflecting the beam towards the spherical mirror segments and a spherical mirror adjacent the deflector mirror is optically located to receive the beam after it is reflected from the spherical mirror segments and to redirect the beam towards the mirrored spinner.

38 Claims, 4 Drawing Sheets

FOCUS CHANGING APPARATUS AND METHOD FOR OPTICAL SCANNERS

BACKGROUND OF THE INVENTION

The present invention relates to optical scanners and more specifically to a focus changing apparatus and method for optical scanners.

Optical scanners are well known for their usefulness in retail checkout and inventory control. Optical scanners used in inventory control generally employ a laser diode, the light from which is focused and collimated to produce a scanning beam. A mirrored spinner directs the beam against a plurality of stationary mirrors, and collects the beam after it is reflected by a bar code label. A motor rotates the mirrored spinner, and a detector receives the returning beam. The pattern produced by such a scanner is characterized by lines oriented at various angles to one another.

The depth of field of such an optical scanner is determined by factors such as motor speed, aperture size, beam speed, and bar code label spacing and dimensions. Attempting to increase depth of field by varying these factors has not proven effective and may degrade scanner performance. Changing the focus by moving the focusing lens or changing the optical path length has proven ineffective as well.

An optical scanner having an increased depth of field is desirable, especially in inventory management, because it would allow a wider range of article sizes to be scanned with the same probability of reading their attached bar code labels.

Therefore, it would be desirable to provide an apparatus for significantly increasing the depth of field of an optical scanner over previous scanners.

SUMMARY OF THE INVENTION

In accordance with the teachings of the present invention, a focus changing apparatus and method for optical scanners is provided. The optical scanner includes a laser source for generating a laser beam having a predetermined focal point, a mirrored spinner for deflecting the beam, pattern mirrors for creating a scan pattern by further reflecting the beam deflected from the mirrored spinner, an optical transceiver for passing the laser beam and for collecting light reflected from a bar code label attached to a scanned article, and a detector for converting the collected light into electrical signals proportional to the intensity of the collected light.

In a first embodiment, the laser beam focus changing apparatus of the present invention is optically located between the laser source and the mirrored spinner and includes a plurality of spherical mirror segments. Each segment has a predetermined radius and is located at its respective radius from a common axis. Preferably, this embodiment employs two pairs of segments having different radii. A spherical mirror segment rotating device, such as a motor, rotates the spherical mirror segments about their common axis.

It is a feature of this embodiment that the spherical mirror segment motor rotates at a predetermined speed slower than the mirrored spinner motor. Thus, this embodiment produces a complete scan pattern at each predetermined focal position.

In a second embodiment, the laser beam focus changing apparatus produces a scan pattern containing scan lines at different focal points and includes a deflector mirror for deflecting the beam from the laser and a plurality of spherical mirror segments mounted on top of the mirrored spinner. Preferably, there is a spherical mirror segment for each facet of the mirrored spinner. As in the first embodiment, each segment has a predetermined radius and is located at its respective radius from a common axis. A spherical mirror segment rotating device, such as a motor, rotates the spherical mirror segments as well as the mirrored spinner about their common axis. Finally, a spherical mirror adjacent the deflector mirror is optically located to receive the beam after it reflects from the spherical mirror segments, to compensate for the larger than desired focus change from the spherical segments, and to redirect the beam towards the mirrored spinner.

It is accordingly an object of the present invention to provide a focus changing apparatus for an optical scanner.

It is another object of the present invention to provide a focus changing apparatus for an optical scanner which employs a plurality of spherical mirror surfaces.

It is another object of the present invention to provide a focus changing apparatus for an optical scanner which employs a plurality of spherical mirror segments which have different radii and are located at their radii from their common axis.

It is another object of the present invention to provide a focus changing apparatus for an optical scanner which employs a plurality of spherical mirror segments mounted on a mirrored spinner within the scanner and which shares a motor in common with the mirrored spinner.

It is another object of the present invention to provide a focus changing apparatus for an optical scanner which employs a plurality of spherical mirror segments rotated by a motor having a speed which is a predetermined amount slower than a motor rotating the mirrored spinner.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
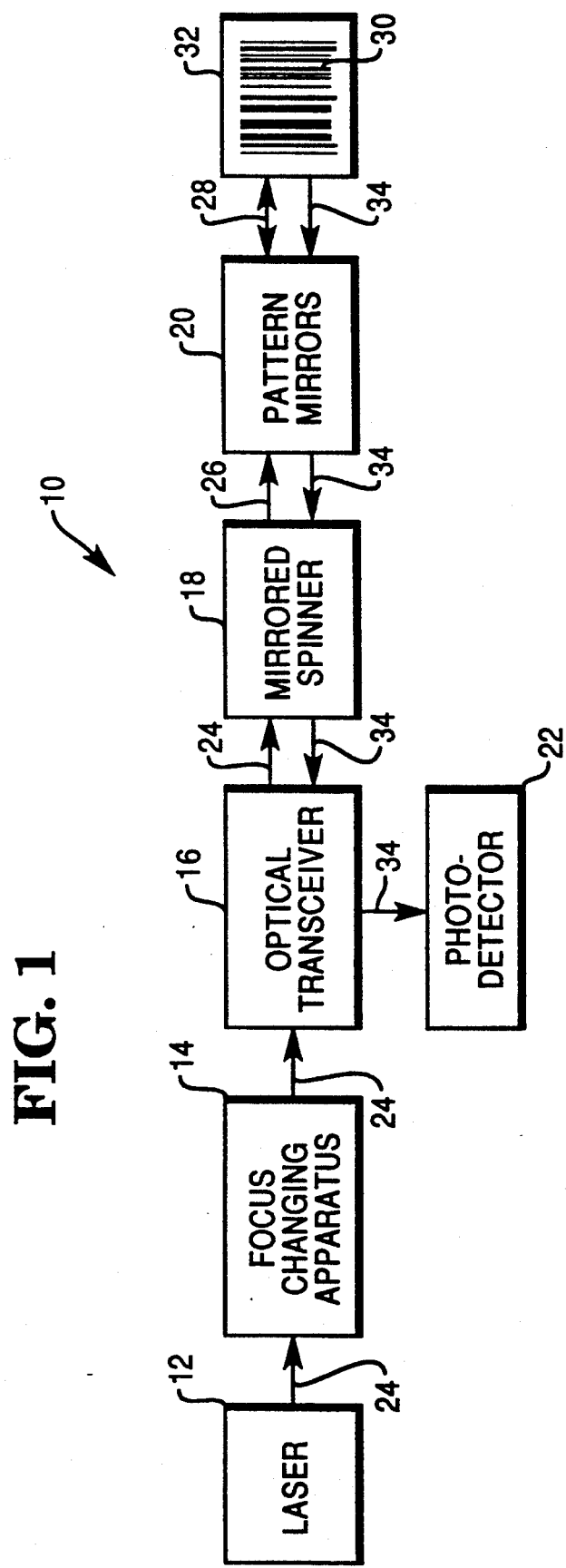
FIG. 1 is a block diagram of an optical scanner, including the focus changing apparatus of the present invention.

Referring now to FIG. 1, optical scanner 10 includes laser 12, focus variation apparatus 14 optical transceiver 16, mirrored spinner 18, pattern mirrors 20, and photodetector 22. Laser 12 includes a laser diode, a focusing lens 23 (FIG. 2) for producing a predetermined focal point or plane, and a collimating aperture, and produces laser beam 24.

Beam 24 contacts focus changing apparatus 14, which alters the focal plane of beam 24 in a cyclical fashion, and then passes through optical transceiver 16. Optical transceiver 16 typically includes a collecting surface having an aperture therethrough for passing beam 24. Beam 24 contacts mirrored spinner 18 which produces scanning beams 26 as it rotates. Scanning beams 26 reflect off of pattern mirrors 20 to form scan lines 28, which together form a scan pattern. Scan lines 28 travel towards bar code label 30 of article 32.

Pattern mirrors 20 direct reflected light 34 from bar code label 30 towards mirrored spinner 18, which further directs reflected light 34 towards optical transceiver 16. Optical transceiver 16 focuses reflected light 34 at photodetector 22, which generates electrical signals representing the intensity of reflected light 34.

Figure 2:
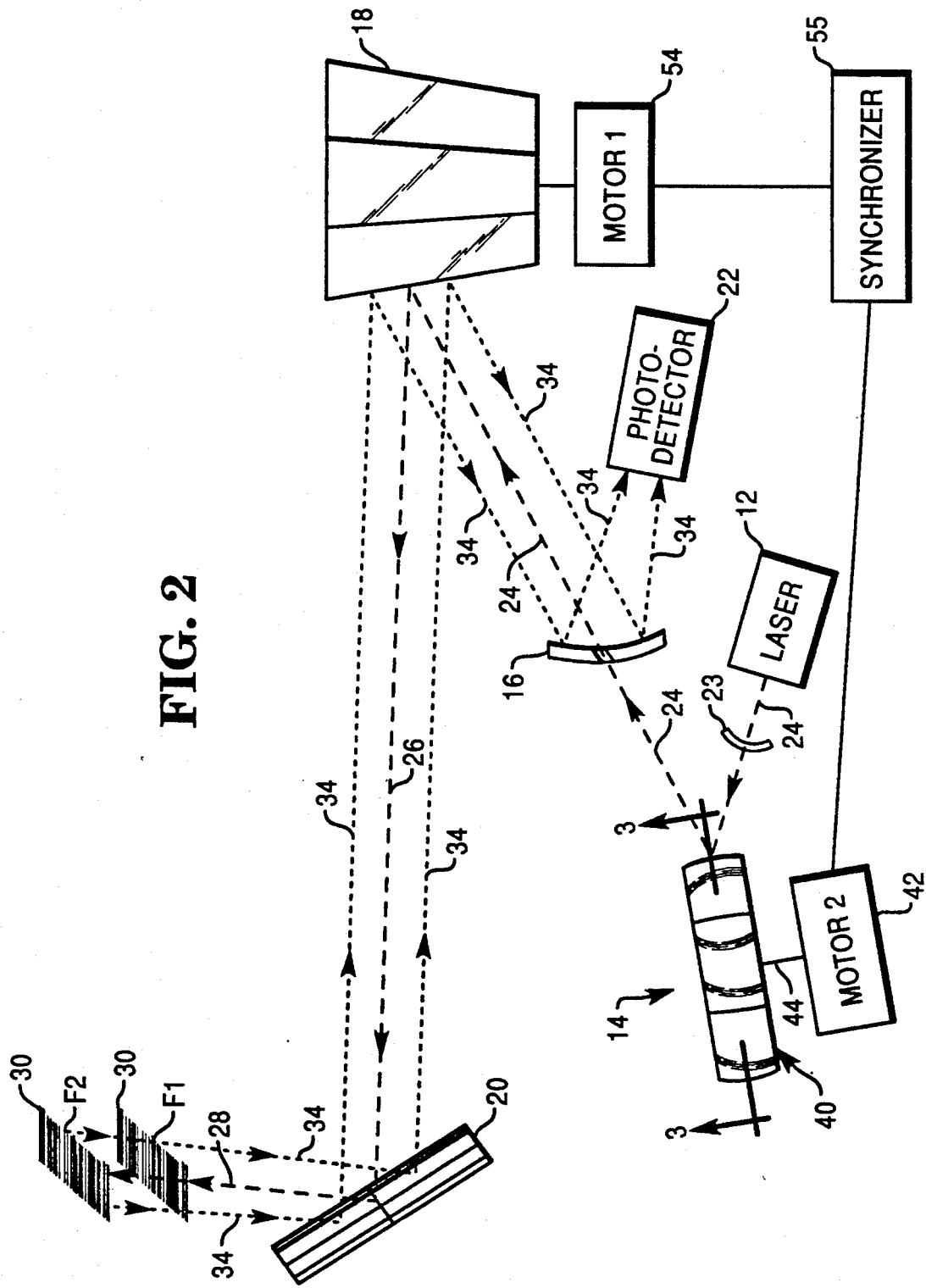
FIG. 2 is a diagrammatic view of the optical scanner, including a first embodiment of the focus changing apparatus of the present invention.
Figure 3:
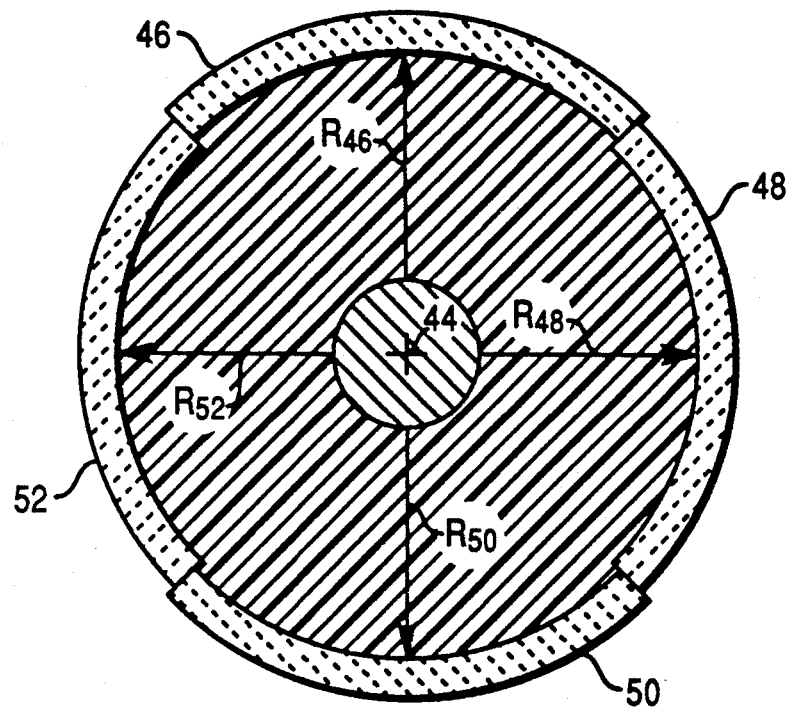
FIG. 3 is a sectional view of the focus changing apparatus of FIG. 2 taken along line 3—3 of FIG. 2.

Turning now to FIGS. 2 and 3, a first embodiment of focus changing apparatus 14 of the present invention includes a ring 40 of spherical segments and motor 42 for rotating ring 40. The segments of ring 40 have predetermined radii of curvature and are located at their respective radii of curvature from a common axis 44.

Preferably, focus changing apparatus 14 includes four segments 46–52 (FIG. 3) for ease of manufacture. Preferably, apparatus 14 is injection molded to optical tolerances. Segments 46–52 have radii R46–R52. Preferably, radii R46 equals R50 and R48 equals R52. The speed of motor 42 is preferably 1500 rpm.

The present invention also envisions any number of segments having different radii of curvature, and also envisions a continuous surface of varying radius instead of separate segments.

Focus changing apparatus 14 additionally shares focusing lens 23 with laser 12.

In operation, focus changing apparatus 14 varies the focal planes of scan lines 28. Focusing lens 23 provides power compensation for any larger than desired focus change by spherical segments 46–52. Scan lines 28 focus at two planes F1 and F2. The speed of motor 54 is preferably 6000 rpm. Since the speed of motor 42 is less than the speed of spinner motor 54, scan lines 28 raster between focal planes F1 and F2. Preferably, F1 and F2 are located 20 and 30 inches above scanner 10, respectively.

Proper selection of the number of mirrored spinner facets and the speed ratio of motor 42 to motor 54 results in a scan pattern having scan lines 28 having minimal breaks. For purposes of illustration, mirrored spinner 18 includes eight facets and the speed ratio of motor 54 to motor 42 is 4:1. Therefore, motor 54 completes one revolution for every fourth of a revolution of motor 42. Motors 54 and 42 are digitally synchronized by synchronizer 55 by known methods. Each revolution of motor 54 produces a complete scan pattern at either focal planes F1 or F2.

Advantageously, focus changing apparatus 14 improves scanner efficiency by increasing pattern depth while collecting reflected light and focusing it to a fixed photodetector position.

Figure 5:
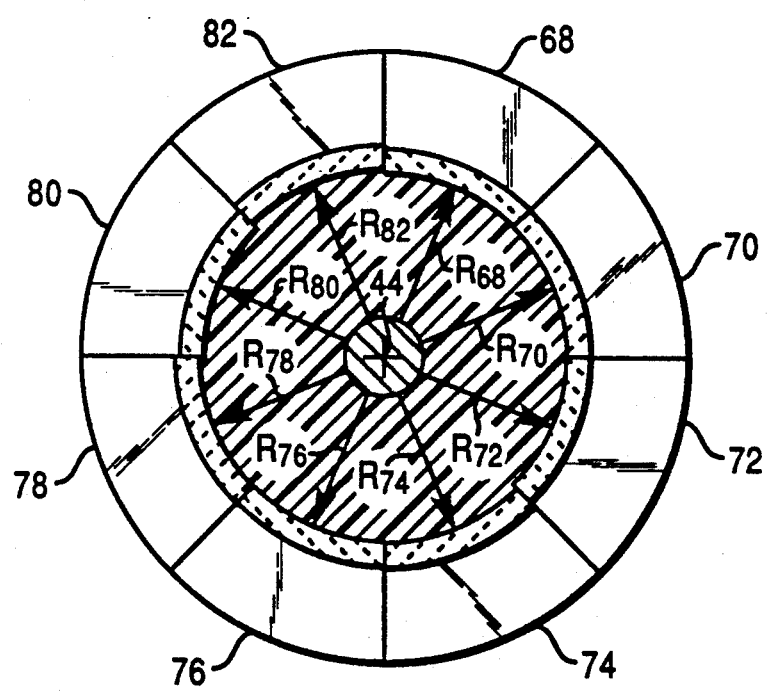
FIG. 5 is a sectional view of the focus variation apparatus of FIG. 4 taken along line 4—4 of FIG. 4.
Figure 4:
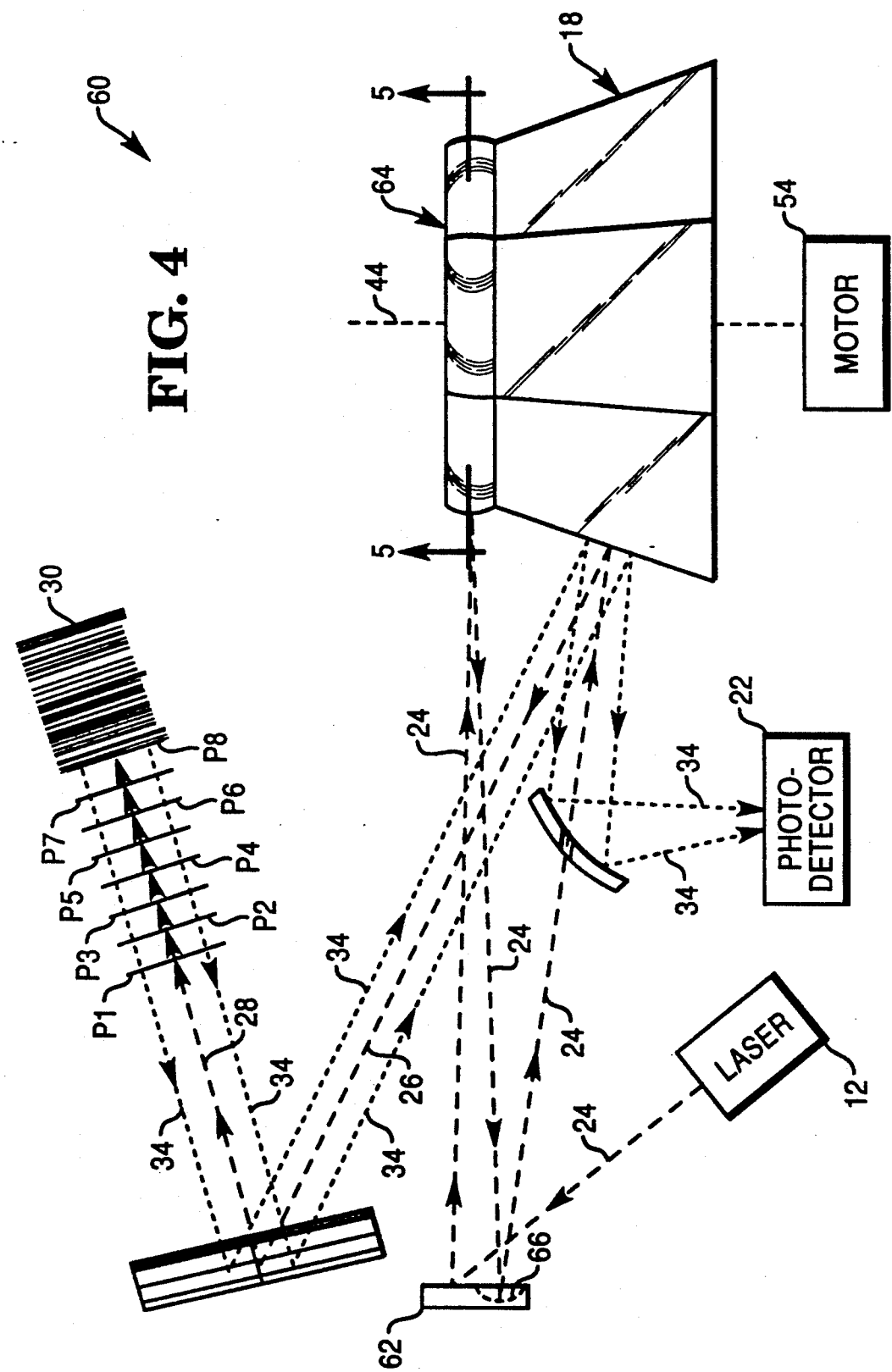
FIG. 4 is a diagrammatic view of the optical scanner, including a second embodiment of the focus changing apparatus of the present invention.

Turning now to FIGS. 4 and 5, a second embodiment 60 of focus changing apparatus 14 of the present invention includes deflector mirror 62, ring 64 of spherical mirror segments, and spherical mirror 66. Deflector mirror 62 reflects beam 24 towards the spherical mirror segments of ring 64 and provides a clear path for spherical mirror 66 to receive the return reflection.

The spherical mirror segments of ring 64 serve to change the power of incident beam 24 and are mounted on mirrored spinner 18 at distances from the spinner axis 44 equal to the radii of the segments. The speed of motor 54 is preferably 6000 rpm. Preferably, each spherical mirror segment has a different radius so as to produce a scan pattern having multiple focal planes and aligns with and mounts above a spinner facet. Advantageously, focus changing apparatus 60 requires only one motor 54.

Spherical mirror 66 compensates for the excess power within beam 24 after reflection from spherical mirror segments of ring 64. Preferably, spherical mirror 66 is concave and located adjacent deflector mirror 62 due to the large angle of incidence presented by spherical mirror segments of ring 64. Preferably, spherical mirror 66 has a radius of 0.76 inches, although the choice of radius depends on the specific desired application.

Preferably, focus changing apparatus 60 includes eight spherical mirror segments 68–82 (FIG. 5) having radii R68–R82. Preferably, radii R68–R82 are 0.75 in. Advantageously, deflector mirror 62, spherical mirror segments 64, and spherical mirror 66 may all be made from molded plastic.

In operation, focus changing apparatus 60 produces a scan pattern made up of scan lines having different focal points. The eight focal planes P1–P8 corresponding to spherical mirror segments 68–82 can be chosen to meet a specific application.

Advantageously, focus changing apparatus 60 acts as a "front end" that will produce multiple scan lines 28 having different focal planes. Its components may be easily molded in plastic. It is modular in design and can easily be adapted to existing optical scanners, or can provide the front end for a new scanner. The design of the pattern generating optics is not affected by the front end and can be implemented separately whenever the pattern requirement is known.

Although the invention has been described with particular reference to certain preferred embodiments thereof, variations and modifications of the present invention can be effected within the spirit and scope of the following claims.

What is claimed is:

1. An optical scanner comprising:
   a laser source for generating a laser beam having a predetermined focal plane;
   a beam-reflecting spinner; and
   a laser beam focus changing apparatus optically located between the laser source and the spinner, including a plurality of spherical mirror segments wherein each segment has a predetermined radius and each segment is located at its respective radius from a common axis and wherein at least two of the segments have different radii for generating different focal lengths, and a spherical mirror segment rotating device.

2. The optical scanner as recited in claim 1, further comprising pattern mirrors for creating a scan pattern by further reflecting the beam deflected from the spinner.

3. The optical scanner as recited in claim 2, further comprising:
   an optical transceiver between the focus changing apparatus and the spinner for passing the laser beam and for collecting light reflected from a bar code label attached to a scanned article; and a detector for converting the collected light into electrical signals proportional to the intensity of the collected light.

4. The optical scanner as recited in claim 1, further comprising:
a power compensating optical element optically located between the laser source and the spherical mirror segments.

5. The optical scanner as recited in claim 4, wherein the spherical mirror segment rotating device comprises a motor.

6. The optical scanner as recited in claim 5, wherein the spinner is driven by another motor.

7. The optical scanner as recited in claim 6, wherein the focus changing apparatus further comprises means for synchronizing the one and the other motors.

8. The optical scanner as recited in claim 4, wherein the power compensating optical element is a spherical convex focusing lens.

9. An optical scanner comprising:
a laser source for generating a laser beam having a predetermined focal plane;
a beam-reflecting spinner;
a laser beam focus changing apparatus optically located between the laser source and the spinner, including a deflector mirror for deflecting the beam from the laser, a plurality of spherical mirror segments optically located in the path of the deflected beam wherein each segment has a predetermined radius and each segment is located at its respective radius from a common axis and wherein at least two of the segments have different radii; and
a spherical mirror segment rotating device.

10. The optical scanner as recited in claim 9, further comprising:
a power compensating optical element adjacent the deflector mirror and optically located to receive the beam after it is reflected from the spherical mirror segments.

11. The optical scanner as recited in claim 10, wherein the spherical mirror segment rotating device comprises a motor.

12. The optical scanner as recited in claim 10, wherein the power compensating optical element is a concave spherical mirror.

13. The optical scanner as recited in claim 10, comprising a spherical mirror segment for each facet of the spinner.

14. The optical scanner as recited in claim 10, wherein the spinner has an axis which coincides with the axis of the spherical segments and wherein the motor rotates both the spinner and the spherical mirror segments.

15. The optical scanner as recited in claim 14, wherein the spherical mirror segments are mounted on top of the spinner.

16. An optical scanner comprising:
a laser source for generating a laser beam having a predetermined focal plane;
a motor-driven mirrored spinner for deflecting the beam;
a laser beam focus changing apparatus optically located between the laser source and the mirrored spinner including a plurality of spherical mirror segments, each segment having a predetermined radius and each segment being located at its respective radius from a common axis, another motor for rotating the spherical mirror segments about the axis, means for synchronizing the one motor with the other motor, and a focusing lens optically located between the laser source and the spherical segments;
pattern mirrors for creating a scan pattern by further reflecting the beam deflected from the mirrored spinner;
an optical transceiver between the focus changing apparatus and the mirrored spinner for passing the laser beam and for collecting light reflected from a bar code label attached to a scanned article; and
a detector for converting the collected light into electrical signals proportional to the intensity of the collected light.

17. An optical scanner comprising:
a laser source for generating a laser beam having a predetermined focal point;
a mirrored spinner for deflecting the beam;
a laser beam focus changing apparatus optically located between the laser source and the mirrored spinner including a deflector mirror for deflecting the beam from the laser and a plurality of spherical mirror segments mounted on top of the mirrored spinner and optically located in the path of the deflected beam, there being a spherical mirror segment for each facet of the spinner, each segment having a predetermined radius and each segment being located at its respective radius from a common axis, the focus changing apparatus further including a motor for rotating the spherical mirror segments and the mirrored spinner, and a spherical concave mirror adjacent the deflector mirror and optically located to receive the beam after it is reflected from the spherical mirror segments and to redirect the beam towards the mirrored spinner;
pattern mirrors for creating a scan pattern by further reflecting the beam deflected from the mirrored spinner;
an optical transceiver between the focus changing apparatus and the mirrored spinner for passing the laser beam and for collecting light reflected from a bar code label attached to a scanned article; and
a detector for converting the collected light into electrical signals proportional to the intensity of the collected light.

18. A laser beam focus changing apparatus for an optical scanner having a motor-driven mirrored spinner comprising:
a plurality of spherical mirror segments, each segment having a predetermined radius and each segment being located at its respective radius from a common axis;
a spherical mirror segment rotating device including another motor;
a power compensating optical element optically located between the laser source and the spherical mirror segments; and
means for synchronizing the one and the other motors.

19. A laser beam focus changing apparatus for an optical scanner comprising:
a deflector mirror for deflecting the beam from the laser;
a plurality of spherical mirror segments mounted on top of a mirrored spinner within the scanner and optically located in the path of the deflected beam, there being a spherical mirror segment for each facet of the spinner, each segment having a predetermined radius and each segment being located at its respective radius from a common axis;

a motor for simultaneously rotating the mirrored spinner and the spherical mirror segments; and a spherical concave mirror adjacent the deflector mirror and optically located to receive the beam after it is reflected from the spherical mirror segments and to redirect the beam towards the mirrored spinner.

20. A method for changing the laser beam focus of an optical scanner comprising the steps of:
   (a) illuminating a spherical reflecting surface with the laser beam, the spherical reflecting surface having a predetermined radius and being located at the radius from an axis;
   (b) rotating the spherical reflecting surface about the axis;
   (c) illuminating a second spherical reflecting surface adjacent the one spherical reflecting surface with the laser beam, the second spherical reflecting surface having a predetermined radius and being located at the radius from the axis; and
   (d) rotating the second spherical surface.

21. The method as recited in claim 20, further comprising the step of:
   (e) illuminating a mirrored spinner within the scanner with the beams reflected off of the one and the second spherical reflecting surfaces.

22. The method as recited in claim 21, further comprising the steps of:
   (f) deflecting the laser beam off of a flat mirror within the scanner towards the one and the second spherical reflecting surfaces;
   (g) compensating for the excess power of the beam reflected from the first and second spherical reflecting surfaces; and
   (h) illuminating a mirrored spinner within the scanner with the beams reflected off of the third spherical reflecting surface.

23. The method as recited in claim 22, wherein step (g) comprises the substep of:
   (g-1) illuminating a spherical concave reflecting surface adjacent to the flat mirror with the beam reflected from the first and second spherical reflecting surfaces.

24. The method as recited in claim 22, further comprising the step of:
   (i) rotating the mirrored spinner and the one and second spherical reflecting surfaces at the same speed.

25. The method as recited in claim 21, further comprising the steps of:
   (f) compensating for the excess power of the beam reflected from the first and second spherical segments;
   (g) rotating the mirrored spinner separately from the spherical segments and at different speeds;
   (h) synchronizing the rotation of the mirrored spinner with the rotation of the spherical segments; and
   (i) illuminating one spherical segment for each complete rotation of the mirrored spinner.

26. The method as recited in claim 25, wherein step (f) comprises the substep of:
   (f-1) moving a laser beam focusing lens to a predetermined position between the laser and the first and second spherical segments.

27. A method for changing the laser beam focus of an optical scanner comprising the steps of:
   (a) illuminating a spherical reflecting surface with the laser beam, the spherical reflecting surface having a predetermined radius and being located at the radius from an axis;
   (b) illuminating a mirrored spinner within the scanner with the beam reflected off of the spherical reflecting surface; and
   (c) compensating for the excess power of the beam reflected from the spherical surface.

28. An optical scanner comprising;
   a laser source for generating a laser beam having a predetermined focal plane;
   a beam-reflecting spinner; and
   a laser beam focus changing apparatus optically located between the laser source and the spinner, including a plurality of spherical mirror segments wherein each segment has a predetermined radius and each segment is located at its respective radius from a common axis, a spherical mirror segment rotating device, and a power compensating optical element optically located between the laser source and the spherical mirror segments.

29. The optical scanner as recited in claim 28, wherein the power compensating optical element is a spherical convex focusing lens.

30. The optical scanner as recited in claim 28, wherein the spherical mirror segment rotating device comprises a motor.

31. The optical scanner as recited in claim 30, wherein the spinner is driven by another motor.

32. The optical scanner as recited in claim 31, wherein the focus changing apparatus further comprises means for synchronizing the one and the other motors.

33. An optical scanner comprising;
   a laser source for generating a laser beam having a predetermined focal plane;
   a beam-reflecting spinner; and
   a laser beam focus changing apparatus optically located between the laser source and the spinner, including a deflector mirror for deflecting the beam from the laser, a plurality of spherical mirror segments optically located in the path of the deflected beam wherein each segment has a predetermined radius and each segment is located at its respective radius from a common axis, a spherical mirror segment rotating device, and a power compensating optical element adjacent the deflector mirror and optically located to receive the beam after it is reflected from the spherical mirror segments.

34. The optical scanner as recited in claim 33, wherein the spherical mirror segment rotating device comprises a motor.

35. The optical scanner as recited in claim 33, wherein the power compensating optical element is a concave spherical mirror.

36. The optical scanner as recited in claim 33, comprising a spherical mirror segment for each facet of the spinner.

37. The optical scanner as recited in claim 33, wherein the spinner has an axis which coincides with the axis of the spherical segments and wherein the motor rotates both the spinner and the spherical mirror segments.

38. The optical scanner as recited in claim 37, wherein the spherical mirror segments are mounted on top of the spinner.

* * * * *